Jan. 11, 1955 R. G. COWAN Re. 23,918

RIM STRUCTURE FOR FLAT TABLEWARE

Original Filed Nov. 30, 1949

INVENTOR.
R. GUY COWAN

BY
Bodell & Thompson
ATTORNEYS

United States Patent Office

Re. 23,918

Reissued Jan. 11, 1955

23,918

RIM STRUCTURE FOR FLAT TABLEWARE

R. Guy Cowan, Fayetteville, N. Y., assignor to Onondaga Pottery Company, Syracuse, N. Y., a corporation of New York Original No. 2,657,558, dated November 3, 1953, Serial No. 130,189, November 30, 1949. Application for reissue June 8, 1954, Serial No. 435,389

3 Claims. (Cl. 65—15)

Matter enclosed in heavy brackets [ ] appears in the original patent but forms no part of this reissue specification; matter printed in italics indicates the additions made by reissue.

This invention relates to articles of tableware, such as plates, platters, and the like, designated generally as flatware and formed of frangible material, such as porcelain, and because they are formed of such material they often become chipped around the edge, especially in hotel and restaurant use.

Various improvements have been heretofore made to minimize edge chipping of the ware. For example, the edge has been formed with a round bead on the underside of the rim at the edge thereof, *see Love Patent No. 226,665, issued April 20, 1880,* [a flattened reinforcement on the under side of the rim at the edge thereof, or a rib on the under side of the rim about halfway between the edge of the rim and the foot. Neither of the aforesaid] *This type of* edge [reinforcements] *reinforcement* is *not* applicable to ware with a scalloped or irregular perimeter since the jigger tool remains stationary during the tooling while the ware is rotated on a mold and therefore the reinforcement [is] *must be* concentric with the central axis of the piece. [Another method has] *Other methods have* been used consisting in *providing a flattened reinforcement on the under side of the rim at the edge thereof or in* making the ware *generally* thicker and thereby heavier which *methods* [destroys] *destroy* its *appearance and* salability for all except the crudest uses [, and increases the expense of manufacture materially].

[This invention has as an object a construction for ware of the type referred to wherein the peripheral edge portion of the ware at the extreme edge is of the conventional thickness of high grade ware for commercial users. It is applicable to ware with scalloped or festooned edge, as well as plain, round edge. Ware with this construction has increased resistance to chipping compared with ware not involving this construction and of comparable edge thickness.]

*This invention has as an object a construction for ware of the type referred to wherein the peripheral portion of the ware at the edge is thin enough to be of pleasing appearance and yet strong enough to be suitable for commercial usage, such as hotels and restaurants, because it has increased resistance to chipping or cracking compared with ware not involving this construction and of comparable edge thickness. The construction of this invention is applicable to ware with scalloped or festooned edge, as well as to ware with non-scalloped or plain edge.* This invention also provides a surface on the under side of the rim which acts as a finger grip when handling the ware that minimizes the danger of the ware slipping out of grasp with the usual and customary finger location used for normal grasping of the ware.

The invention consists in the novel features and in the combinations and constructions hereinafter set forth and claimed.

In describing this invention, reference is had to the accompanying drawings in which like characters designate corresponding parts in all the views.

Figure 1:
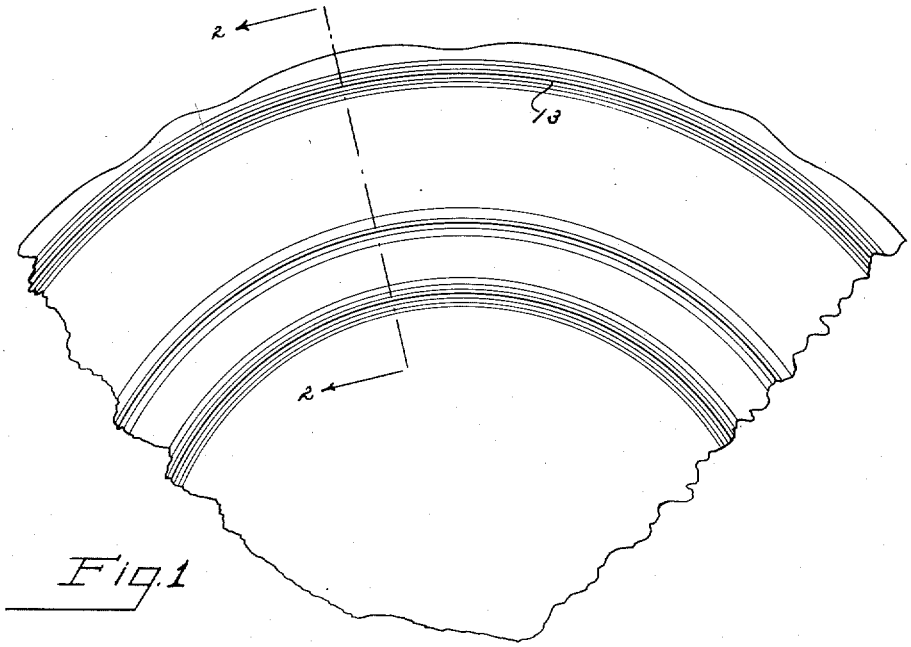
Figure 1 is a plan view of the under side of a section of a plate formed in accordance with my invention.
Figure 2:
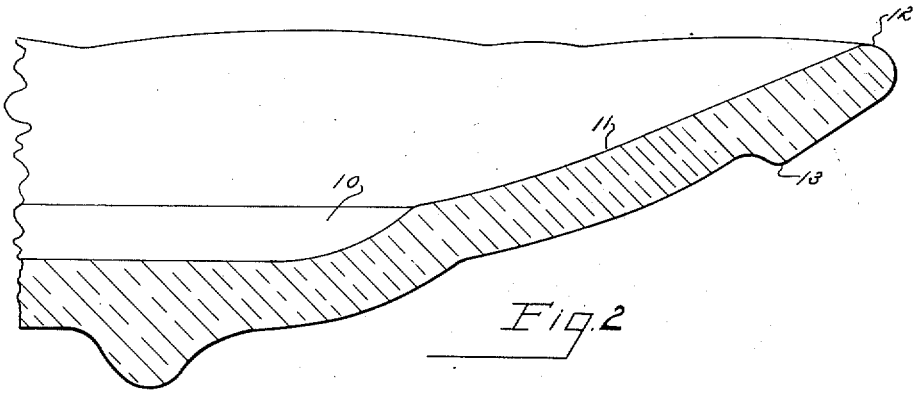
Figure 2 is an enlarged sectional view taken on line 2—2, Figure 1.

The plate is formed with a central section 10 commonly referred to as a food well. This central section is encircled by a rim portion 11, the peripheral edge 12 of which is [substantially the same thickness as] *preferably of a thickness not greater than* the major portion of the rim. The rim is formed with a reinforcing *portion terminating in a* rib *or shoulder* 13 arranged inwardly from the peripheral edge and extending concentrically with the axis of the ware. The rib 13 merges with the periphery of the plate or, in other words, the surface of the rib converges with the top surface of the rim portion.

With this arrangement, the peripheral [part] *edge* of the rim is [substantially the same thickness as] *preferably no thicker than* the major portion of the rim, whereby the ware has the same appearance and feel as if no thickening of the rim existed. However, the thickened portion [effected by] *terminating in* the rib 13 is positioned to reinforce the resistance to the impact of any blow on the edge of the ware. That is, the force of any impact applied to the edge of the ware is transmitted immediately to the thickened portion which is of sufficient strength to increase the resistance to cracking or chipping. Heretofore, it was the general theory that the edge of the ware had to be the thickest part of the rim portion in order to effectively resist impacts which would ordinarily cause chipping *or cracking* of the ware. I have found however that with the rib 13 spaced inwardly from but merging with and forming a part of the peripheral edge portion, *in accordance with this invention,* impacts which would ordinarily cause chipping *or cracking* of the ware are effectively resisted and the life of the ware materially prolonged and yet the weight of the ware is not markedly increased and the appearance and salability of the ware [is] *are* not impaired.

In the drawings, the plate is illustrated as having a scalloped edge. [In ware of this type the usual bead or welt is not applicable due to their being concentric with the axis of the ware, whereas the extreme edge of the ware is at varying distances from the axis of the ware.] *The usual bead or roll on the under side of the outer edge is not applicable to ware having a scalloped or irregular peripheral edge since the peripheral bead, by reason of its method of formation, must be concentric with the axis of the ware and therefore cannot follow a scalloped edge which is at varying distances from the axis of the ware. In the present invention, the shoulder or rib 13 is concentric with the axis of the ware but is positioned inwardly of the deepest indentations of a scalloped edge, the shoulder tapering gradually toward the peripheral edge to effect increased strength and a pleasing appearance, as aforementioned. With this tapered construction, the actual thickness of the extreme edge of scalloped ware will vary with the scallop pattern, being slightly thicker at the indentations, or innermost points of the edge, than at the projections or outermost points of the edge.*

[It] *From the foregoing, it* should be obvious that [the same advantages obtained with my construction exist with] *my improved construction, with its attendant advantages, may be applied to* plain, round [,] edge ware as [with] *well as to* scalloped or festooned edge ware.

While in the construction *herein* described, the edge of the plate is [of conventional thickness, the bead] *thin enough to be of pleasing appearance, the shoulder* or rib 13 is of substantial height relative to the adjoining under surface of the rim of the plate and thus forms, or provides, a finger grip on the under side of the rim spaced inwardly a sufficient distance from the edge of the plate to be engaged by the finger in the natural handling of the plate. Accordingly, this rib serves the dual function of substantially resisting chipping of the ware and rendering it more easy and safe to handle.

What I claim is:

[1. A plate or similar article of tableware formed of frangible material comprising a substantially flat central portion encircled by a rim portion extending from said central portion at an angle of 20° or less to the horizontal, said rim portion having an annular portion of gradually and uniformly increasing thickness from the peripheral edge thereof to a shoulder on the underside of said rim spaced from said peripheral edge and an annular portion of uniform thickness from said shoulder to said central portion, the thickness of said last-named annular portion being substantially equal to the thickness of the peripheral edge of said rim.]

*2. A plate or similar article of tableware formed of frangible material comprising a substantially flat central portion encircled by a foot and a rim portion exterior to the foot, said rim portion extending upwardly and having a reinforcing portion on the under side thereof extending from the peripheral edge of the rim and gradually increasing in thickness from said edge and terminating in a shoulder projecting on the under side of said rim portion located between said edge and said foot, said shoulder being concentric with the axis of the article as formed, said reinforcing portion increasing resistance to chipping or cracking at the peripheral edge of said article.*

*3. A plate or similar article of tableware formed of frangible material by means including a mold forming the concave surface thereof and a jigger tool spaced from said mold and forming the convex surface thereof by relative rotation of said mold and tool, said article having a substantially flat central portion encircled by a foot and a rim portion, said rim portion having a reinforcing portion extending from the peripheral edge and increasing gradually in thickness from said peripheral edge and terminating in a shoulder projecting on the under side of said rim portion between said edge and said foot, said shoulder being concentric with the axis of the article as formed, said reinforcing portion increasing resistance to chipping or cracking at the peripheral edge of said article.*

*4. A plate or similar article of tableware formed of frangible material by means including a mold forming the concave surface thereof and a jigger tool spaced from said mold and forming the convex surface thereof by relative rotation of said mold and tool, said article having a substantially flat central portion encircled by a foot and a rim portion having a scalloped peripheral edge, said rim portion having a reinforcing portion extending from the peripheral edge and increasing gradually in thickness from said peripheral edge and terminating in a shoulder projecting on the under side of said rim portion between said edge and said foot, said shoulder being concentric with the axis of the article as formed, said reinforcing portion increasing resistance to chipping or cracking at the peripheral edge of said article.*

References Cited in the file of this patent or the original patent

UNITED STATES PATENTS

| | | |
|---|---|---|
| D. 8,465 | Lyon | July 6, 1875 |
| D. 23,900 | Haviland | Dec. 25, 1894 |
| D. 25,515 | Haviland | May 19, 1896 |
| D. 25,516 | Haviland | May 19, 1896 |
| D. 101,983 | Duncan 3d et al. | Nov. 17, 1936 |
| 63,138 | Chapman | Mar. 26, 1867 |
| 226,665 | Love | Apr. 20, 1880 |
| 260,470 | Fisher | July 4, 1882 |
| 1,022,882 | Schwenn | Apr. 9, 1912 |
| 1,882,198 | Slick | Oct. 11, 1932 |
| 1,901,837 | Bateholts | Mar. 14, 1933 |
| 1,977,700 | Sebring, Jr., et al. | Oct. 23, 1934 |
| 2,142,811 | Agonis | Jan. 3, 1939 |
| 2,178,274 | Ratner | Oct. 31, 1939 |
| 2,235,502 | Leppke | Mar. 18, 1941 |
| 2,240,842 | Gehring et al. | May 6, 1941 |
| 2,469,777 | Mohun | May 10, 1949 |
| 2,474,509 | Allen | June 28, 1949 |
| 2,599,910 | Guthrie | June 10, 1952 |

FOREIGN PATENTS

| | | |
|---|---|---|
| 8,827 | Great Britain | Apr. 16, 1902 |
| 10,384 | Great Britain | June 6, 1900 |
| 11,161 | Great Britain | May 9, 1911 |
| 27,836 | Great Britain | Dec. 7, 1896 |
| 42,411 | France | Apr. 25, 1933 |
| 525,264 | Great Britain | Aug. 26, 1940 |
| 621,567 | France | Feb. 7, 1927 |
| 724,290 | Germany | Aug. 22, 1942 |